United States Patent
Gen-Kuong et al.

[11] Patent Number: 6,044,700
[45] Date of Patent: Apr. 4, 2000

[54] AIRCRAFT EQUIPMENT CONFIGURATION IDENTIFICATION INTERFACE GUIDE

[75] Inventors: Fernando Francisco Gen-Kuong, Laguna Niguel; Alexis Gabriel Karolys, San Clemente, both of Calif.

[73] Assignee: Endevco Corporation, San Juan, Calif.

[21] Appl. No.: 09/056,510

[22] Filed: Apr. 7, 1998

Related U.S. Application Data

[63] Continuation-in-part of application No. 08/949,461, Oct. 14, 1997.

[51] Int. Cl.⁷ .............................. G01C 28/00; F02P 17/00
[52] U.S. Cl. ...................... 73/178 R; 439/955; 324/402
[58] Field of Search ................... 73/178 R; 324/402, 324/380, 384; 307/9.1, 10.1; 364/924.034; 439/133, 374, 488, 954, 955, 81, 218

[56] References Cited

U.S. PATENT DOCUMENTS

| | | | |
|---|---|---|---|
| 3,229,240 | 1/1966 | Harrison, Sr. et al. | 339/170 |
| 4,112,748 | 9/1978 | Walley | 73/118 |
| 4,410,230 | 10/1983 | SanMiguel | 339/176 |
| 4,488,240 | 12/1984 | Kapadia et al. | 364/508 |
| 4,608,650 | 8/1986 | Kapadia | 364/508 |
| 4,684,896 | 8/1987 | Weishaupt | 324/399 |
| 4,689,573 | 8/1987 | Hilmer | 324/380 |
| 4,898,539 | 2/1990 | Glover et al. | 439/81 |
| 4,935,846 | 6/1990 | Karolys et al. | 361/391 |
| 5,295,641 | 3/1994 | Kaptein | 244/1 |
| 5,330,370 | 7/1994 | Reddersen et al. | 439/955 |
| 5,491,418 | 2/1996 | Alfaro et al. | 324/402 |
| 5,496,196 | 3/1996 | Schachtebeck | 439/682 |
| 5,511,944 | 4/1996 | Ide et al. | 416/31 |
| 5,551,649 | 9/1996 | Kaptein | 244/1 |
| 5,635,841 | 6/1997 | Taylor | 324/380 |
| 5,761,447 | 6/1998 | Knox et al. | 439/218 |
| 5,846,097 | 12/1998 | Marian, Jr. | 439/955 |

OTHER PUBLICATIONS

Kaster Hand Tools Catalog—Oct. 1, 1991.

*Primary Examiner*—Willaim Oen
*Attorney, Agent, or Firm*—Stetina Brunda Garred & Brucker

[57] ABSTRACT

An informational/positional guide, which is disposable in an aircraft instrumentation interface, used with at least one mechanical guide key configured to guide interface engagement, and the guide key having an orientation specific to a particular type of aircraft equipment configuration, the guide is provided with a key engagement member. The key engagement member is formed to engage the guide key and is disposable in a variety of angular orientations to facilitate engagement with the guide key. The key engagement member is further provided with an aircraft equipment configuration sensor for identifying the aircraft equipment configuration type in response to sensed orientation of the key engagement member and for generating an electronic signal in response to the identification of the orientation of the key engagement member.

17 Claims, 4 Drawing Sheets

AIRCRAFT EQUIPMENT CONFIGURATION IDENTIFICATION INTERFACE GUIDE

RELATED APPLICATIONS

This is a continuation-in-part application of U.S. patent application Ser. No. 08/949,461 filed on Oct. 14, 1997, entitled Vibration Monitoring System for Multiple Aircraft Engines, which is hereby incorporated by reference.

FIELD OF THE INVENTION

This invention generally relates to aircraft instrumentation interface guides, and in particular to an instrumentation interface guide which utilizes a mechanical key to identify the specific aircraft equipment configuration, such as the aircraft type and engine type configuration, connected thereto.

BACKGROUND OF THE INVENTION

The utilization of testing and monitoring instrumentation devices for usage with modern aircraft is a focus of consideration. This is especially the case in light of compliance with ever-changing and increasingly stringent governmental safety regulations. Such test instrumentation devices may be necessary to perform engine vibration analysis, for example. In addition, other devices may be used to test fuel systems, hydraulic pressure systems, avionics systems, on-board communications systems, environmental control systems, and all other aircraft systems and subsystems which are electrically or electro-mechanically tested and/or monitored.

Generally, a test instrumentation system would include a test instrumentation device and an apparatus to connect the device to an output from a sensor in the aircraft. For example, in the context of engine vibration analysis, an engine vibration analysis device, via an electrical cable harness, would be connected to an accelerometer located adjacent to an aircraft engine. It is contemplated that the test instrumentation device would perform test sequences based upon a variety of variables, which could include the specific aircraft type and model, and specific type and model of the relevant aircraft component parts, such as the engines. Thus, there must be provided a method of informing the test instrumentation device of the relevant information regarding these variables.

A variety of test instrumentation system configurations have been developed to provide the system with the relevant information regarding the particular equipment configuration, such as the aircraft type and engine type configuration, to allow it to perform the appropriate test sequence. For example, a conventional test instrumentation system configuration may employ a generic test instrumentation device which mates with an aircraft/engine type configuration specific insert unit containing the test specification data corresponding to that particular aircraft/engine type configuration. In the case of a portable test instrumentation device which is used for ground-based servicing of a variety of aircraft/engine type configurations, however, the user is burdened with the requirement of purchasing a variety of aircraft/engine type specific insert units.

Another conventional system approach employs a generic test instrumentation device which has a stored library of test specifications corresponding to a variety of aircraft equipment configurations. Such a generic test instrumentation device is provided with a selection device through which the operator inputs, for example, the aircraft/engine type configuration, thereby informing the test instrumentation device which set of test specifications to use for analysis. This selection device may be a dial with various settings corresponding to a given aircraft/engine type or a key pad which a user types in a specific code corresponding to a given aircraft/engine type. This system, however, is subject to user errors in correctly setting the system to the particular aircraft/engine type because of the nature of the selection device used. For example, where the system is used to service multiple aircraft/engines on the ground, each time the user services a different aircraft/engine, the user must input through the selection device which aircraft/engine type the system is connected to. In the case of a dial type selection device, the user is required to turn the dial to the setting corresponding to the appropriate aircraft/engine type. This task is subject to user error, as the user may be inattentive while setting the dial or may simply forget to change the setting of the dial completely. In the case of a key pad type selection device, the user is required to key-in code corresponding to a given aircraft/engine type. Similarly, this task is subject to user error, as the user may be inattentive while keying-in the appropriate aircraft/engine type code or may key-in the code from memory (which of course is fallible).

Another system approach employs a configuration having an aircraft/engine type specific test instrumentation device with aircraft/engine type specific data being integral to the device. In the case of a portable test instrumentation device which is used for ground-based servicing of a variety of aircraft/engine types, the user burdened with the requirement of purchasing numerous test instrumentation devices for each aircraft/engine type. Moreover, the test instrumentation device is the most expensive system component. In addition, regardless of whether the aircraft/engine type specific test instrumentation device is integral to an aircraft/engine or portable used to service a variety of aircraft/engines, this configuration requires a manufacturer to produce a multitude of different test instrumentation devices, rather than a single generic one. Such a manufacturing requirement imposes added product costs.

As a safety measure, it is customary for aircraft manufacturers to specify that the instrumentation interface for cables connectors, wire harnesses and other electronic connection devices are constructed in a manner which helps ensure that appropriate test instrumentation devices are connected to the aircraft/engine. Thus, to ensure that the appropriate test device is connected to an aircraft/engine, the instrumentation interface may be formed such that only the appropriate mating connectors are engaged. In practice, for example, a maintenance worker is physically prevented from connecting cable attached to a given aircraft/engine type to a test instrumentation device suited for a different aircraft/engine type.

A conventional arrangement for is to provide the interface with at least one mechanical guide key configured to guide interface engagement. In addition, the guide key is disposed in the connector interface having an orientation specific to a particular type of aircraft/engine. Further, multiple guide keys may be provided having a combination of orientations corresponding to a particular type of aircraft/engines. Thus, in the case of an electrical pin connector, where various pins of a pin connector are engaged with the corresponding female connector, a guide key may be disposed in a male connector (pin-side) to guide the pins into proper alignment with the corresponding female connector. The corresponding female connector would be provided with a key engagement member which is particularly oriented to engage the guide key. Thus, this arrangement prevents the engagement between non-corresponding connectors suited for two different aircraft/engine types.

It is therefore evident that there exists a need in the art for a system of connecting test instrumentation devices to a variety of aircraft equipment configurations, such that the connection interface is formed to only allow engagement between a test instrumentation device and corresponding aircraft and the instrumentation device is provided with the identity of the equipment type configuration that it is connected to, in order to perform an appropriate test sequence.

SUMMARY OF THE INVENTION

The present invention specifically addresses the above-mentioned deficiencies associated with the prior art. More particularly, in accordance with the present invention, an informational/positional guide, which is disposable in an aircraft instrumentation interface, used with at least one mechanical guide key configured to guide interface engagement, and the guide key having an orientation specific to a particular type of aircraft equipment configuration, the guide is provided with a key engagement member. The key engagement member is formed to engage the guide key and is disposable in a variety of angular orientations to facilitate engagement with the guide key. The key engagement member is further provided with an aircraft equipment configuration sensor for identifying the equipment configuration in response to sensed orientation of the key engagement member and for generating an electronic signal in response to the identification of the orientation of the key engagement member.

As used herein, aircraft equipment configuration includes, for example, a particular aircraft type and engine type combination and characteristics particular to such combination. Examples of other aircraft equipment configurations include those configurations relating to test fuel systems, hydraulic pressure systems, avionics systems, on-board communications systems, environmental control systems, and all other aircraft systems and subsystems which are electrically or electro-mechanically tested and/or monitored.

In the preferred embodiment of the present invention, the key engagement member is provided with an electrical contact surface. The position of the electrical contact surface is defined by the orientation of the key engagement member. The aircraft equipment configuration sensor is in electrical communication with the electrical contact surface.

In addition, the aircraft equipment configuration sensor is provided with a plurality of electrical contact pads. The electrical contact pads are disposable proximate to the electrical contact surface. A selective one of the electrical contact pads is in electrical communication with the electrical contact surface based upon the orientation of the electrical contact surface. The aircraft equipment configuration sensor is further provided with aircraft equipment configuration identification circuitry which is in electrical communication with the electrical contact pads. The aircraft equipment configuration identification circuitry identifies the particular electrical contact pad in electrical communication with the electrical contact surface and generates an electrical signal in response to the identification of the contact pad. A microprocessor is preferably provided and is formed to receive the electronic signal from the aircraft equipment configuration sensor, for correlating the electronic signal to aircraft equipment configuration specific test sequence data.

Preferably, the key engagement member is provided with at least one pin. The electrical contact surface is disposed at one end of the pin. The key engagement member is further provided with at least one spring in compressive contact with a respective pin such that the spring pushes the pin against the selected electrical contact pad. In another embodiment of the present invention, the spring is disposed in compressive contact with the key engagement member, rather than directly with the pin, such that the pin pushes against the selected electrical contact pad. In addition, the key engagement member may be formed to be a female connector.

In practice, for example, a mechanical key and corresponding key engagement member may have a hexagonal cross-section key and thus oriented in six orientations (at 60 degree intervals). The contact pad that makes contact with the key engagement member pin is read as a logical low (0) by the aircraft equipment configuration identification circuitry. The remaining five contact pads are read as a logical high (1) by the aircraft equipment configuration identification circuitry. Each pin can be represented by a number from 0 to 6, where 0 represents no pin, and 1 through 6 represent the position of the pin in relation to the contact pads. The aircraft equipment configuration identification circuitry would identify 7 to the Nth power unique combinations of the position of the pins, where N is the number of pins. Up to 343 unique combinations of the positioning of the pins can be identified if three pins with associated key engagement members and keys are used (7 to the Nth power).

In another embodiment of the present invention, the informational/positional guide described above may be disposed in a test instrumentation device for testing an aircraft component. Preferably, the test instrumentation device is provided with a microprocessor. The microprocessor is formed to receive the electronic signal from the aircraft equipment configuration sensor, for correlating the electronic signal to aircraft equipment configuration specific test sequence data.

In addition, there is provided a method of identifying the type of aircraft equipment configuration connected to an instrumentation interface having an informational/positional guide having at least one mechanical guide key configured to guide interface engagement, the guide key having an orientation specific to a particular type of aircraft equipment configuration. The method calls for providing a key engagement member, formed to engage the guide key and disposable in a variety of angular orientations to facilitate engagement with the guide key. The orientation of the key engagement member is sensed. In addition, an output signal representative of the sensed orientation of the key engagement member is generated corresponding to a particular type of aircraft equipment configuration. Preferably, the electronic signal is correlated to aircraft equipment configuration specific test sequence data.

Advantageously, where the test instrumentation interface guide of the present invention is used in conjunction with a test instrumentation device to test a variety of aircraft having a variety of aircraft equipment configurations on the ground, user errors associated with configuring the system to analyze a particular aircraft equipment configurations are mitigated. In order to verify that the appropriate aircraft equipment configuration specific test sequence is performed, the user needs only to connect the system at the interface which utilizes the interface guide of the present invention. Thus, this configuration mitigates user error problems associated with those prior system configurations which employ a generic test instrumentation device with aircraft equipment configuration specific insert units, as well as those which require the user to manually set the system to access the specific aircraft equipment configuration specific data.

In addition, the system configuration of the present invention allows for a single generic test instrumentation device to be utilized for testing or monitoring a variety of aircraft equipment configurations. Testing and analysis of multiple aircraft equipment configuration types is achieved with a single generic test instrumentation device and the corresponding connecting cable with the aircraft equipment configuration specific test instrumentation guide of the present invention.

Thus, where the user utilizes the system to service a variety of aircraft equipment configurations, the user needs only to purchase a single test instrumentation device (the most expensive test system component) and the appropriate connecting cables with the appropriate interface guides (which are relatively low cost).

Conveniently, the present invention allows a manufacturer to produce generic test instrumentation devices. Aircraft equipment configuration specific system component parts only include the interface guide components.

It is also contemplated that interface guide components may be available to the user unassembled, and therefore not oriented to correspond to any particular aircraft equipment configuration. Such generic interface guide component parts alleviate the manufacturer and user from having to track and identify the parts based upon the assembled guide orientations and thereby the associated part numbers are reduced.

Based upon the foregoing, the instrumentation interface guide of the present invention represents an advance of art.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Referring now to the drawings wherein in the showings are for purposes of illustrating a preferred embodiment of the present invention only, and not for purposes of limiting the same, FIGS. 1–14 illustrate an informational/positional guide 10 for an aircraft instrumentation interface 12 constructed in accordance with the present invention.

In accordance with the present invention, an informational/positional guide 10, which is disposable in an aircraft instrumentation interface 12, used with at least one mechanical guide key 14 configured to guide interface engagement, and the guide key 14 having an orientation specific to a particular type of aircraft equipment configuration, the guide 10 is provided with a key engagement member 16. The key engagement member 16 is formed to engage the guide key 14 and is disposable in a variety of angular orientations to facilitate engagement with the guide key 14. The key engagement member 16 is further provided with an aircraft equipment configuration sensor 18 for identifying the aircraft equipment configuration in response to sensed orientation of the key engagement member 16 and for generating an electronic signal in response to the identification of the orientation of the key engagement member 16.

As used herein, aircraft equipment configuration includes, for example, a particular aircraft type and engine type combination and characteristics particular to such combination. Examples of other aircraft equipment configurations include those configurations relating to test fuel systems, hydraulic pressure systems, avionics systems, on-board communications systems, environmental control systems, and all other aircraft systems and subsystems which are electrically or electro-mechanically tested and/or monitored.

It is contemplated that a suitable method for structurally supporting the key engagement member 16 in position relative to its location within the aircraft instrumentation interface 12 may be chosen from those well known to one of ordinary skill in the art.

Figures 1, 4:
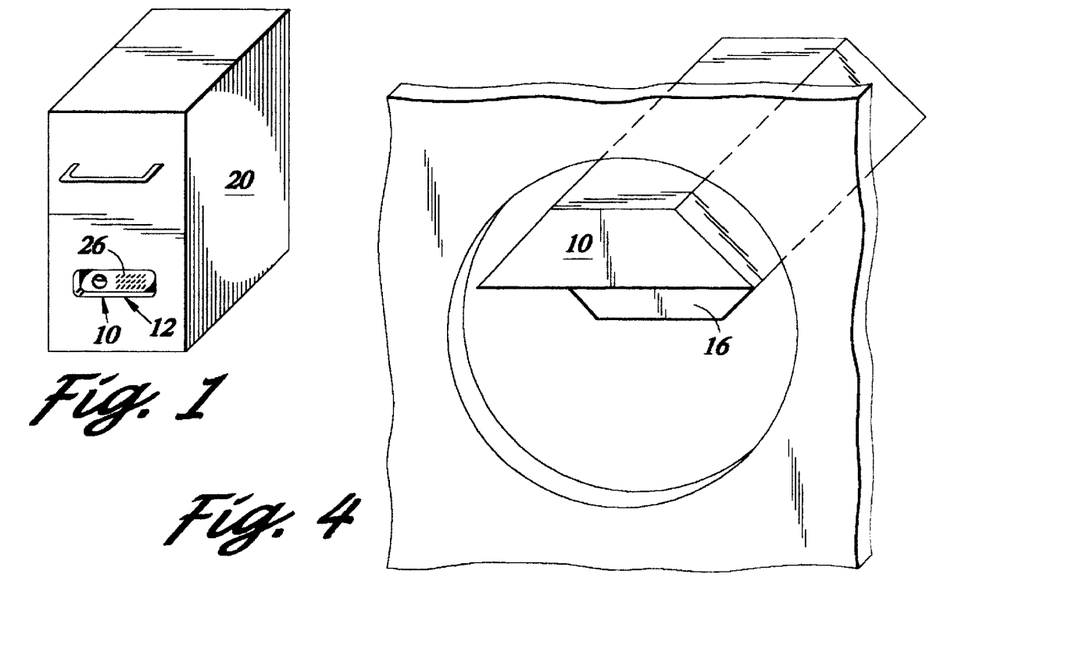
FIG. 1 is a perspective view of the informational/positional guide of the present invention disposed in an instrumentation interface of an aircraft test instrumentation device.
FIG. 4 is an exploded perspective view of a key engagement member of the informational/positional guide depicted in FIGS. 1 and 2.

Referring now to FIG. 1, there is depicted an aircraft test instrumentation device 20. Disposed in the aircraft test instrumentation device 20 is a test instrumentation interface 12 provided with a key engagement member 16 and a plurality of data pins 26. Similarly, in FIG. 2, there is depicted an aircraft testing cable 22 with cable connector 24 in which there is disposed a test instrumentation interface 12 provided with an informational/positional guide 10 and a plurality of data pins 26. It is contemplated that such an aircraft testing cable 22 would be utilized to link testing data between an aircraft or component thereof and an aircraft test instrumentation device (symbolically depicted in FIG. 1, as aircraft test instrumentation device 20). FIG. 4 depicts an exploded view of the key engagement member 16 as would be seen in both FIGS. 1 and 2.

Figure 2:
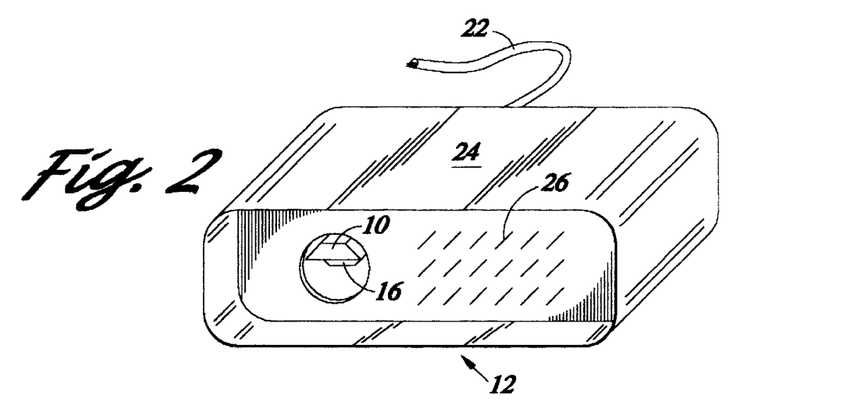
FIG. 2 is a perspective view of the informational/positional guide of the present invention disposed in an instrumentation interface of an aircraft instrumentation cable connector.
Figure 3:
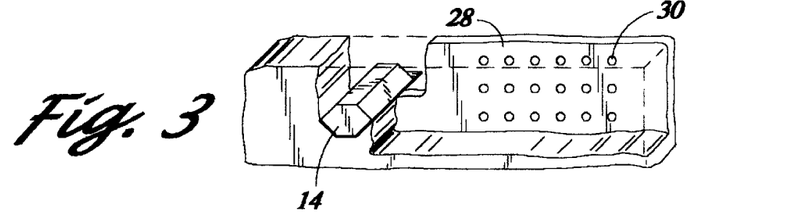
FIG. 3 is an exploded perspective view of the guide key used in conjunction with an informational/positional guide depicted in FIGS. 1 and 2.
Figure 5:
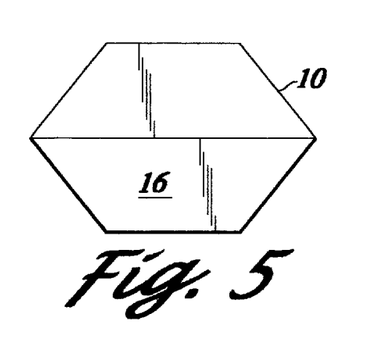
FIG. 5 is a top view of an informational/positional guide of the present invention.
Figure 6:
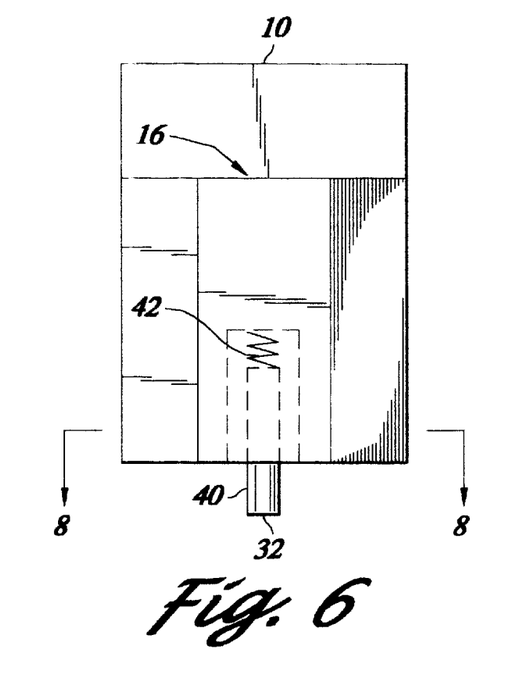
FIG. 6 is a side view of the informational/positional guide depicted in FIG. 5.
Figure 7:
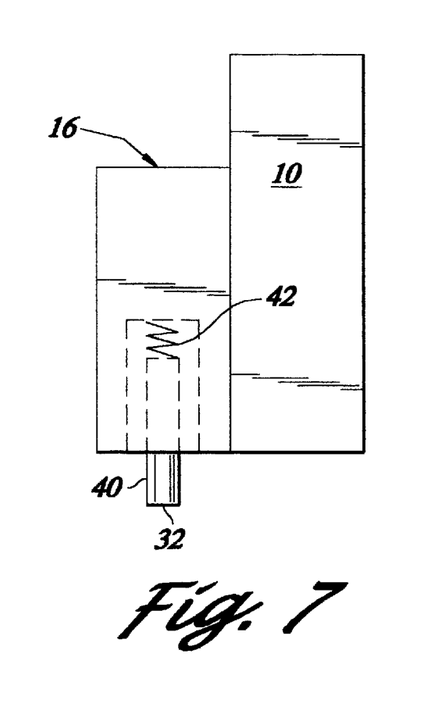
FIG. 7 is another side view of the informational/positional guide, rotated 90 degrees in comparison to the view shown in FIG. 6.
Figure 8:
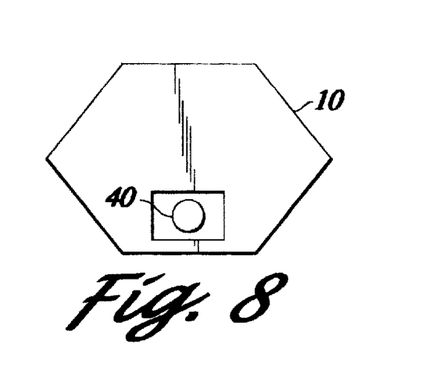
FIG. 8 is a cross-sectional top view of the informational/positional guide as seen along axis 8—8 of FIG. 6.

As depicted in both FIGS. 1 and 2, the test instrumentation interface 12 is depicted as a male interface (i.e., having pins 26) and is contemplated to be engaged by a corresponding female interface 28 (as depicted in FIG. 3, as represented by dashed lines). The corresponding female interface 28 is provided with pin receiving holes 30 and a guide key 14 (shown in solid lines). It is contemplated, however, that the test instrumentation interface 12 could be formed to be a female interface (as depicted) or a male interface. In addition, the key engagement member 16 may be formed to be a female connector as is shown in FIGS. 1–2, 4, 5–7 and 9 or a male connector (not shown). Although not depicted, it is further contemplated that multiple key engagement members, such as key engagement member 16, may be provided to be used in conjunction with corresponding guide keys, such as guide key 14.

In practice, the guide key 14 mates with the key engagement member 16 to guide into engagement the data pins 26 and the pin receiving holes 30. As can be seen, the angular orientation of the guide key 14 must be mirrored by the key engagement member 16 in order for the test instrumentation interface 12 to be connected to the female interface 28. Thus, were the guide key 14 to be angularly rotated by 60 degrees, for example, connection between the test instrumentation interface 12 and female interface 28 would be physically prevented. Accordingly, only where the guide key 14 and the key engagement member 16 are correctly oriented, engagement of the test instrumentation interface 12 and female interface 28 would be allowed.

Thus, where the test informational/positional guide 10 of the present invention is used in conjunction with an aircraft test instrumentation device (such as the aircraft test instrumentation device 20 of FIG. 1) to test a variety of aircraft equipment configuration types, user errors associated with configuring the system to analyze a particular aircraft equipment configuration are mitigated. In order to verify that the appropriate aircraft equipment configuration specific test sequence is performed, the user needs only to connect the test instrumentation interface 12 to a corresponding female interface (such as the female interface 28 of FIG. 3).

Figure 9:
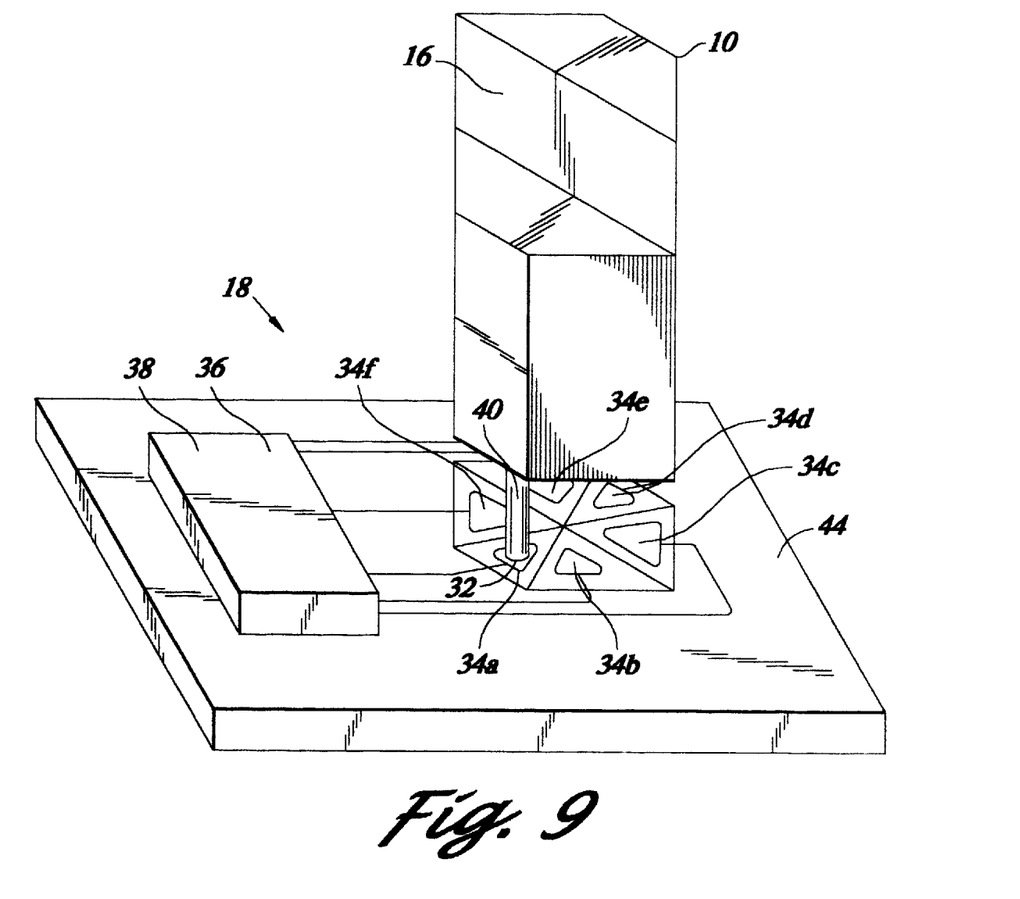
FIG. 9 is a perspective view of the key engagement member and electrical contact pads of the informational/positional guide of the present invention.
Figure 10:
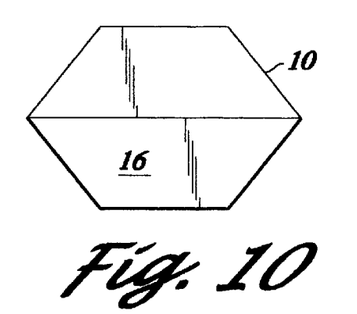
FIG. 10 is a top view of the key engagement member with an alternate pin and spring configuration of another embodiment of the informational/positional guide of the present invention.
Figure 11:
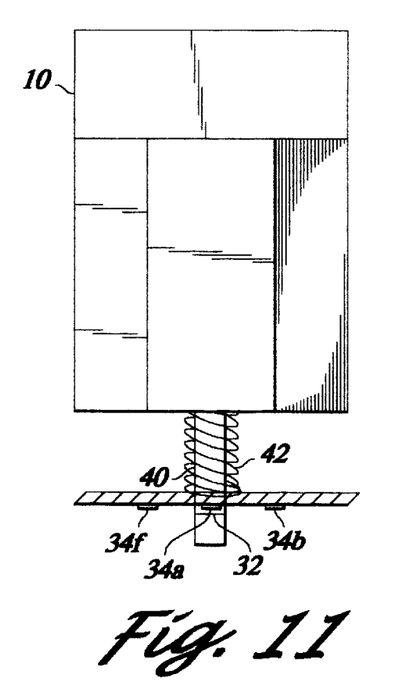
FIG. 11 is a side view of the informational/positional guide depicted in FIG. 10.
Figure 12:
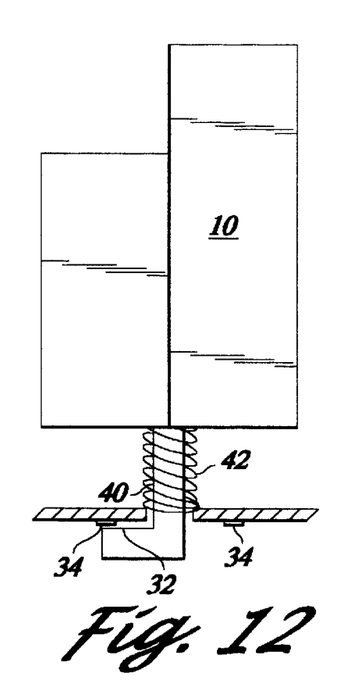
FIG. 12 is another side view of the informational/positional guide, rotated 90 degrees in comparison to the view shown in FIG. 11.
Figure 13:
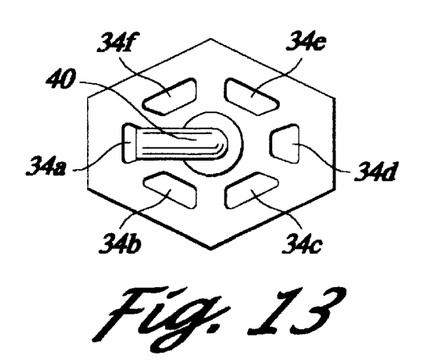
FIG. 13 is a bottom view of the informational/positional guide as seen along axis 13—13 of FIG. 12.

Referring now to FIGS. 5–8, there is depicted a key engagement member 16. Referring now to FIG. 9, there is depicted a key engagement member 16 and a aircraft equipment configuration sensor 18.

Preferably, the key engagement member 16 is provided with at least one pin 40. An electrical contact surface 32 is disposed at one end of the pin 40. The position of the electrical contact surface 32 is defined by the orientation of the key engagement member 16. The aircraft equipment configuration sensor 18 is in electrical communication with the electrical contact surface 32. In addition, the aircraft equipment configuration sensor 18 is provided with a plurality of electrical contact pads 34a–f, as shown in FIG. 9. The electrical contact pads 34a–f are disposable proximate to the electrical contact surface 32. A selective one of the electrical contact pads 34a–f is in electrical communication with the electrical contact surface 32 based upon the position of the electrical contact surface 32. Electrical contact pad 34a is depicted in contact with electrical contact surface 32. The aircraft equipment configuration sensor 18 is further provided with aircraft equipment configuration identification circuitry 36 which is in electrical communication with the electrical contact pads 34a–f. The aircraft equipment configuration identification circuity 36 identifies the particular electrical contact pad (34a, 34b, 34c, 34d, 34e or 34f) in electrical communication with the electrical contact surface 32 and generates an electrical signal in response to the identification of the contact pad (34a, 34b, 34c, 34d, 34e or 34f). It is contemplated that the electrical contact pads 34 may be imprinted on circuit board 44 as depicted in FIG. 9. A microprocessor 38 is preferably provided and is formed to receive the electronic signal from the aircraft equipment configuration sensor 18, for correlating the electronic signal to aircraft equipment configuration specific test sequence data.

As illustrated in FIGS. 5–9, the key engagement member 16 is further provided with at least one spring 42 in compressive contact with a respective pin such that the spring 42 pushes the pin 40 against the selected electrical contact pad (34a, 34b, 34c, 34d, 34e or 34f).

In practice, for example, as shown in FIGS. 1–13, a mechanical guide key 14 and corresponding key engagement member 16 may have a hexagonal cross-section and oriented in six orientations (at 60 degree intervals). Referring to FIG. 9, the particular contact pad 34a making contact with the key engagement member pin 40 is read as a logical low (0) by the aircraft equipment configuration identification circuitry 36. The remaining five contact pads 34b–f are read as a logical high (1) by the aircraft equipment configuration identification circuitry 36. Pin 40 can be represented by a number from 0 to 6, where 0 represents no pin, and 1 through 6 represent the position of the pin in relation to the contact pads 34. The aircraft equipment configuration identification circuitry 36 would identify 7 to the Nth power unique combinations of the position of the pins, where N is the number of pins. Up to 343 unique combinations of the positioning of the pins can be identified if three pins with associated key engagement members and guide keys are used (7 to the Nth power).

In another embodiment of the present invention, as shown in FIGS. 10–13, the spring 42 is disposed in compressive contact with the key engagement member 16, rather than directly with the pin 40, such that the pin 40 pushes against the selected electrical contact pad 34a. This pin/spring arrangement is especially advantageous, because it is contemplated that the orientation of the key engagement member 16 could be readily reconfigured (i.e., reoriented to correspond to a different aircraft equipment configuration type). This would be accomplished, for example, by inserting a flat-headed screw driver at the test instrumentation interface 12 in contact with and applying axial force to the key engagement member 16 to thereby disengage the electrical contact surface 32 from the respective electrical contact pad 34 (for example, electrical contact pad 34a in FIG. 13). Simultaneously, the key engagement member 16 could be rotated, thereby reconfiguring the orientation of the key engagement member 16 such that the electrical contact surface 32 is aligned with another respective electrical contact pad 34 (for example, electrical contact pad 34b, 34c, 34d, 34e, or 34f, in FIG. 13). Furthermore, this pin/spring arrangement allows for the contact pads 34 to be disposed at a greater radial distance away from the longitudinal axis of the key engagement member 16. By disposing the contact pads 34 at a further distance, the manufacturing tolerances of the construction of the contact pads 34 could be increased, thereby reducing manufacturing costs.

In another embodiment of the present invention, the information/positional guide 10 described above may be disposed in a test instrumentation device 20 for testing an aircraft component, as depicted in FIG. 1.

In addition, there is provided a method of identifying the type of aircraft equipment configuration connected to an instrumentation interface 12 having a mechanical guide key 14 configured to guide interface engagement, the guide key 14 having an orientation specific to a particular type of aircraft equipment configuration. The method calls for providing a key engagement member 16, formed to engage the guide key 14 and disposable in a variety of angular orientations to facilitate engagement with the guide key 14. The orientation of the key engagement member 16 is sensed. In addition, an output signal representative of the sensed orientation of the key engagement member 16 is generated corresponding to a particular type of aircraft equipment configuration. Preferably, the electronic signal is correlated to aircraft equipment configuration specific test sequence data.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An information/positional guide, disposable in an aircraft instrumentation interface, used with at least one mechanical guide key configured to guide interface engagement, the guide key having an orientation specific to a particular type of aircraft equipment configuration, the guide comprising:

a key engagement member, formed to engage the guide key and disposable in a variety of angular orientations to facilitate engagement with the guide key; and an aircraft equipment configuration sensor for identifying the aircraft equipment configuration type in response to sensed orientation of the key engagement member and for generating an electronic signal in response to the identification of the orientation of the key engagement member.

2. The guide of claim 1 wherein the key engagement member comprising an electrical contact surface, the position of the electrical contact surface defined by the orientation of the key engagement member, and the aircraft equipment configuration sensor being in electrical communication with the electrical contact surface.

3. The guide of claim 2 wherein the aircraft equipment configuration sensor comprising:

a plurality of electrical contact pads disposable proximate the electrical contact surface, a selective one of the electrical contact pads in electrical communication with the electrical contact surface based upon the position of the electrical contact surface; and aircraft equipment configuration identification circuitry in electrical communication with the electrical contact pads for identifying the electrical contact pad in electrical communication with the electrical contact surface and for generating an electrical signal in response to the identification of the contact pad.

4. The guide of claim 3 wherein the key engagement member further comprising:

at least one pin, the electrical contact surface disposed at one end of the pin;

at least one spring in compressive contact with a respective pin such that the spring pushes the pin against the selected electrical contact pad.

5. The guide of claim 3 wherein the key engagement member further comprising:

at least one pin, the electrical contact surface disposed at one end of the pin; and at least one spring in compressive contact with the key engagement member such that the pin pushes against the selected electrical contact pad.

6. The guide of claim 1 wherein the key engagement member being a female connector.

7. The guide of claim 3 further comprising a microprocessor, formed to receive the electronic signal from the aircraft equipment configuration sensor, for correlating the electronic signal to aircraft equipment configuration specific test sequence data.

8. A test instrumentation device for testing an aircraft component, electronically connectable to an aircraft through an instrumentation interface having a information/positional guide used with a mechanical guide key have an orientation specific to a particular type of aircraft equipment configuration, the aircraft instrumentation device comprising:

an information/positional guide comprising a key engagement member, formed to engage the guide key and disposable in a variety of angular orientations to facilitate engagement with the guide key and an aircraft equipment configuration sensor for identifying the aircraft equipment configuration type in response to sensed orientation of the key engagement member and for generating an electronic signal in response to the identification of the orientation of the key engagement member.

9. The test instrumentation device of claim 8 wherein the key engagement member comprising an electrical contact surface, the position of the electrical contact surface defined by the orientation of the key engagement member, and the aircraft equipment configuration sensor being in electrical communication with the electrical contact surface.

10. The test instrumentation device of claim 9 wherein the aircraft equipment configuration sensor comprising:

a plurality of electrical contact pads disposable proximate the electrical contact surface, a selective one of the electrical contact pads in electrical communication with the electrical contact surface based upon the position of the electrical contact surface; and aircraft equipment configuration identification circuitry in electrical communication with the electrical contact pads for identifying the electrical contact pad in electrical communication with the electrical contact surface and for generating an electrical signal in response to the identification of the contact pad.

11. The test instrumentation device of claim 10 wherein the key engagement member further comprising:

at least one pin, the electrical contact surface disposed at one end of the pin;

at least one spring in compressive contact with a respective pin such that the spring pushes the pin against the selected electrical contact pad.

12. The guide of claim 10 wherein the key engagement member further comprising:

at least one pin, the electrical contact surface disposed at one end of the pin; and at least one spring in compressive contact with the key engagement member such that the pin pushes against the selected electrical contact pad.

13. The test instrumentation device of claim 10 wherein the key engagement member being a female connector.

14. The test instrumentation device of claim 10 further comprising a microprocessor, formed to receive the electronic signal from the aircraft equipment configuration sensor, for correlating the electronic signal to aircraft equipment configuration specific test sequence data.

15. A method of identifying the type of aircraft equipment configuration connected to an instrumentation interface having a informational/positional guide used with a mechanical guide key configured to guide interface engagement, the guide key having an orientation specific to a particular type of aircraft equipment configuration, the method comprising the steps of:

(a) providing a key engagement member, formed to engage the guide key and disposable in a variety of angular orientations to facilitate engagement with the guide key; and (b) sensing the orientation of the key engagement member.

16. The method of claim 15 further comprising the step of:

(c) generating an output signal representative of the sensed orientation of the key engagement member corresponding to a particular type of aircraft equipment configuration.

17. The method of claim 16 further comprising the step of:

(d) correlating the electronic signal to aircraft equipment configuration specific test sequence data.

* * * * *